(12) United States Patent
Rozitis et al.

(10) Patent No.: US 8,254,021 B2
(45) Date of Patent: Aug. 28, 2012

(54) METHOD AND APPARATUS FOR SPECIMEN ILLUMINATION IN A MICROSCOPE

(75) Inventors: Peter A. Rozitis, Midland (CA); Kevin B. Wagner, Wyevale (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 480 days.

(21) Appl. No.: 12/490,149

(22) Filed: Jun. 23, 2009

(65) Prior Publication Data

US 2010/0321774 A1 Dec. 23, 2010

(51) Int. Cl.
  *G02B 21/06* (2006.01)
(52) U.S. Cl. ........................ 359/385; 385/390
(58) Field of Classification Search ................ 359/385, 359/389, 390; 385/92, 93; 362/230, 231, 362/235, 362, 368, 373
  See application file for complete search history.

(56) References Cited

U.S. PATENT DOCUMENTS

| | | | | |
|---|---|---|---|---|
| 4,818,085 A * | 4/1989 | Schindl et al. | ................ | 359/390 |
| 4,855,875 A * | 8/1989 | Onose et al. | ................ | 362/572 |
| 5,329,436 A * | 7/1994 | Chiu | ................ | 362/294 |
| 5,400,176 A * | 3/1995 | Dreessen et al. | ................ | 359/385 |
| 7,262,909 B2 * | 8/2007 | Bosser et al. | ................ | 359/385 |
| 7,502,164 B2 * | 3/2009 | Lytle et al. | ................ | 359/388 |
| 7,511,886 B2 * | 3/2009 | Schultz et al. | ................ | 359/486.03 |
| 7,524,097 B2 * | 4/2009 | Turnbull et al. | ................ | 362/545 |
| 7,839,566 B2 * | 11/2010 | Andrews et al. | ................ | 359/385 |
| 2007/0153372 A1 * | 7/2007 | Mazel | ................ | 359/385 |

FOREIGN PATENT DOCUMENTS

WO WO 2006/133899 A2 12/2006

OTHER PUBLICATIONS

Marketing brochure, "Colibri—Highlights for Fluorescence Microscopy", Carl Zeiss Microimaging GmbH, Göttingen, Germany, May 2007, 12 pages.
Marketing brochure, "LumiSens Modules & Instruments", Sensovation AG, Stockach, Germany, no date, 6 pages.
Product data sheet, "LumiSens 830—Miniaturized Fluorescence Imaging Module with 8 Mpixel CCD", Sensovation AG, Stockach, Germany, no date, 1 page.

\* cited by examiner

*Primary Examiner* — Frank Font
(74) *Attorney, Agent, or Firm* — Lando & Anastasi, LLP

(57) ABSTRACT

A microscope includes a base having thereon first optics that image a region that includes a location for a specimen. A method and apparatus involve: removably supporting on the base an illumination module that includes a source of radiation and second optics; and delivering radiation from the source to the location utilizing optical structure embodied entirely within the second optics, including directing radiation traveling from the source to the location through a lens that is part of the second optics.

20 Claims, 12 Drawing Sheets

METHOD AND APPARATUS FOR SPECIMEN ILLUMINATION IN A MICROSCOPE

FIELD OF THE INVENTION

This invention relates in general to microscopes and, more particularly, to techniques for illuminating a specimen in a microscope.

BACKGROUND

In a microscope used for fluorescence microscopy, the focusing optics do not need to be moved a large distance in order to achieve the necessary degree of focus. Instead, only a small amount of movement is needed, but it is desirable that this movement be carried with a very high degree of accuracy, for example in small increments on the order of about 10 microns. Although existing microscopes have provided an adequate degree of accuracy in focus, this accuracy has not been entirely satisfactory. This is due in part to the fact that existing focus drives tend to have a degree of backlash that reduces the accuracy of the focus.

A further consideration is that, in fluorescence microscopy, light emitting diode (LED) devices are used as light sources. Sometimes it is necessary to change a light source, for example to replace an LED that has failed, or to change the color (wavelength) of the illumination. In order to change a light source, it is typically necessary to carry out a significant degree of disassembly of the microscope in order to reach the light source. Moreover, where the replacement is being carried out in order to adjust the wavelength of the illumination, it may also be necessary to adjust the focal length, and/or change some optical components such as lenses and/or filters. This can involve replacing several independent components. As a result, the overall procedure, while adequate for its intended purposes, tends to be time consuming, and can involve replacement of multiple components on an item-by-item basis.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
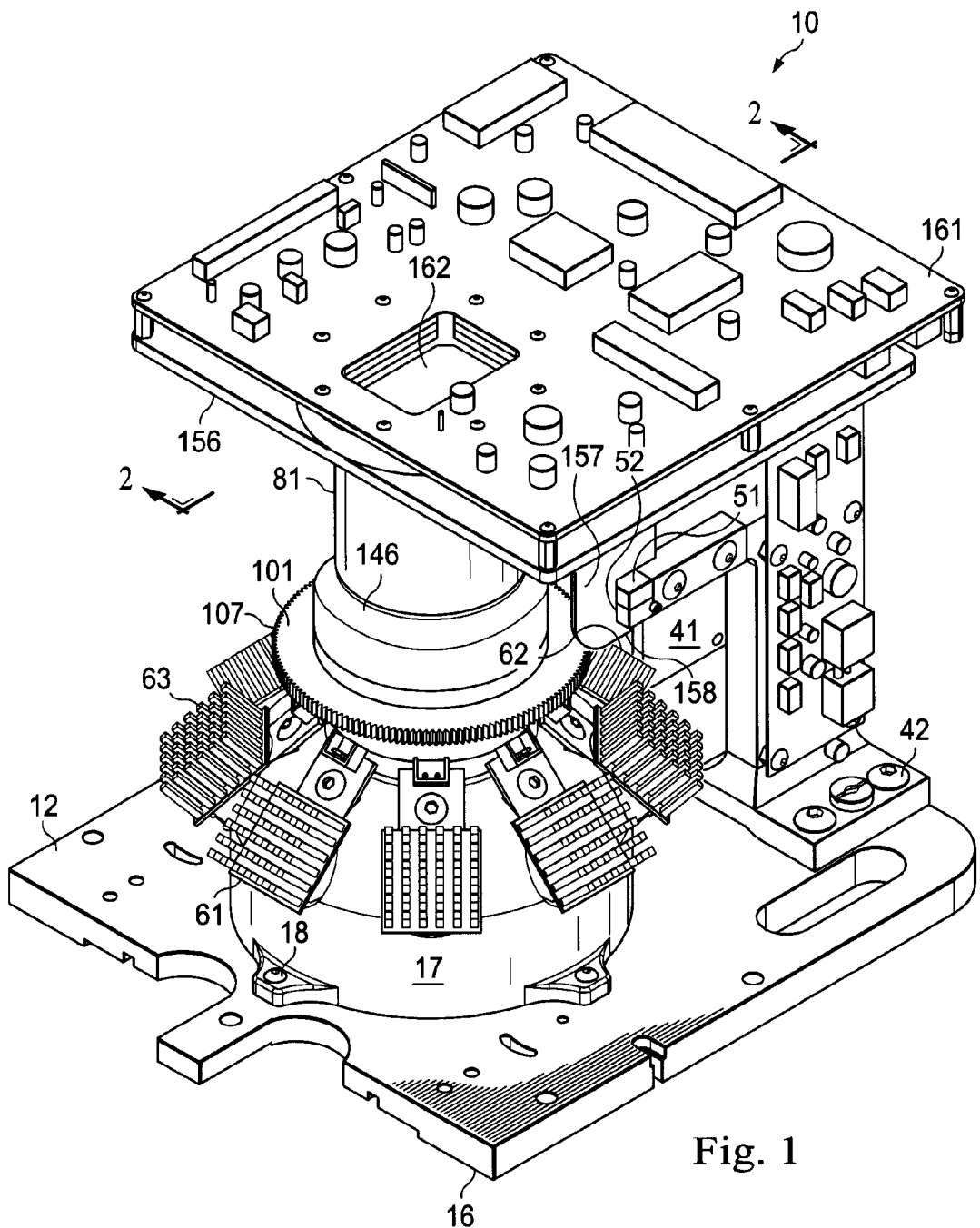
FIG. 1 is a diagrammatic perspective view of a microscope that embodies aspects of the invention.
Figure 2:
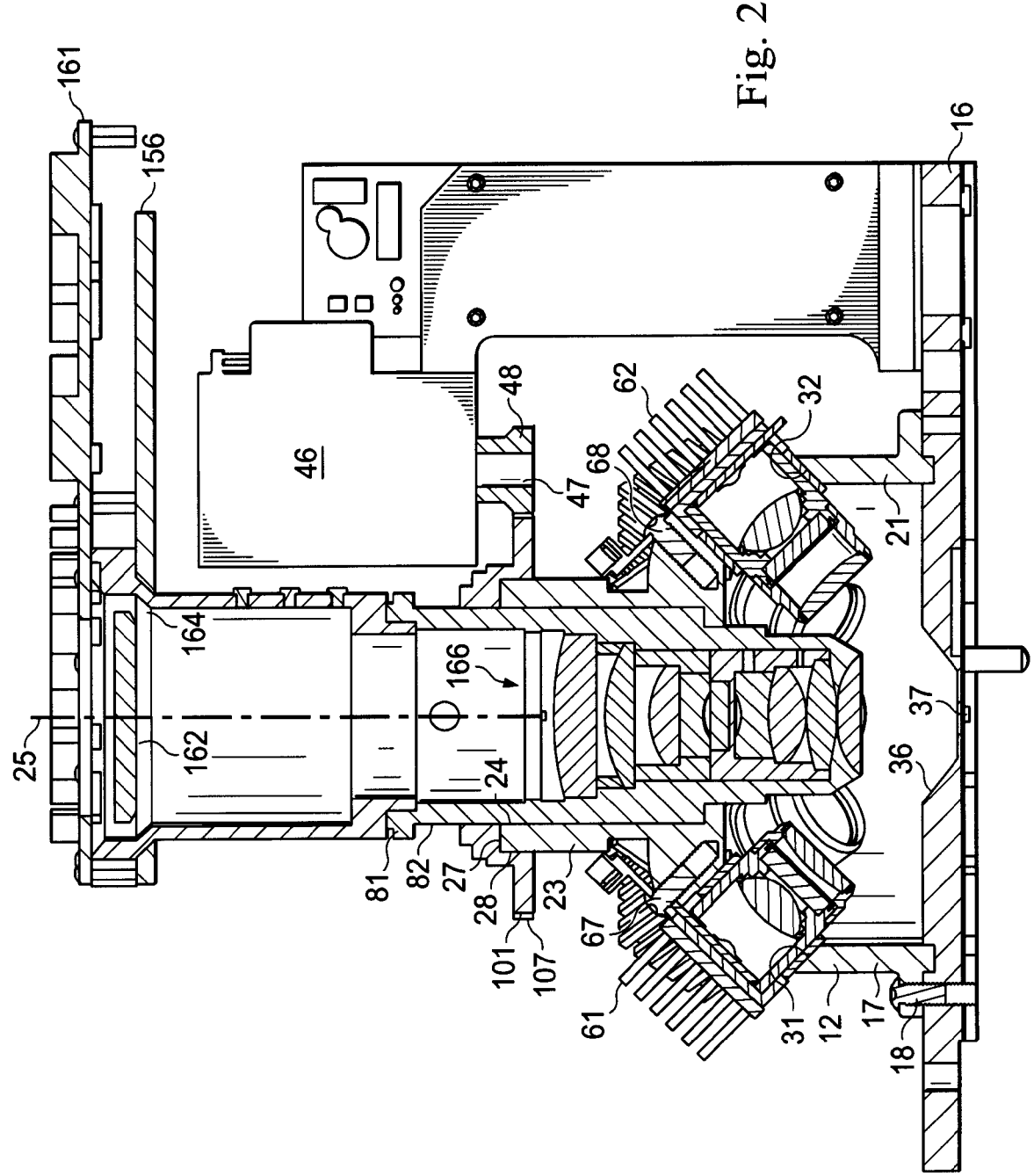
FIG. 2 is a diagrammatic sectional side view, taken along the section line 2-2 in FIG. 1.

FIG. 1 is a diagrammatic perspective view of a microscope 10 that embodies aspects of the invention. For simplicity and clarity, an outer housing of the microscope 10 has been omitted in the drawings. The microscope 10 is used for fluorescence analysis, but could alternatively be used for some other purpose. FIG. 2 is a diagrammatic sectional side view of the microscope 10, taken along the section line 2-2 in FIG. 1.

The microscope 10 has an aluminum base 12 that includes a lower part 16 in a form of a base plate, and an upper part 17 in the form of a shell. The shell 17 is fixedly secured to the base plate 16 by a plurality of screws 18. As best seen in FIG. 2, the base 12 has a chamber 21 therein, defined by a downwardly open recess in the shell 17. The upper portion of the shell 17 includes a vertically upwardly extending projection 23 having a cylindrical outer surface that is concentric to a vertical axis 25. A cylindrical opening 24 extends vertically through the projection 23. The cylindrical opening 24 is concentric to the vertical axis 25, has a lower end that opens into the chamber 21, and has an upper end that opens through a top surface 27 of the shell 17. The top surface 27 is an axially upwardly facing annular bearing surface. A radially outwardly facing annular bearing surface 28 is provided adjacent the upper end of the projection 23. The bearing surfaces 27 and 28 are each concentric to the vertical axis 25.

The shell 17 has eight uniformly circumferentially spaced cylindrical openings that extend therethrough from the chamber 21 to the outer surface of the shell at an angle of approximately 45° with respect to the vertical axis 25. Two of the these openings are visible in FIG. 2, and are respectively designated by reference numerals 31 and 32.

The base plate 16 has a downwardly converging frusto-conical opening 36 therethrough. The opening 36 is concentric to the vertical axis 25. At its upper end, the opening 36 communicates with the chamber 21. A conventional and not-illustrated specimen support can be removably secured against an underside of the base plate 16, in order to support a specimen at a location 37 that is identified in FIG. 2 by a small rectangle.

Figure 3:
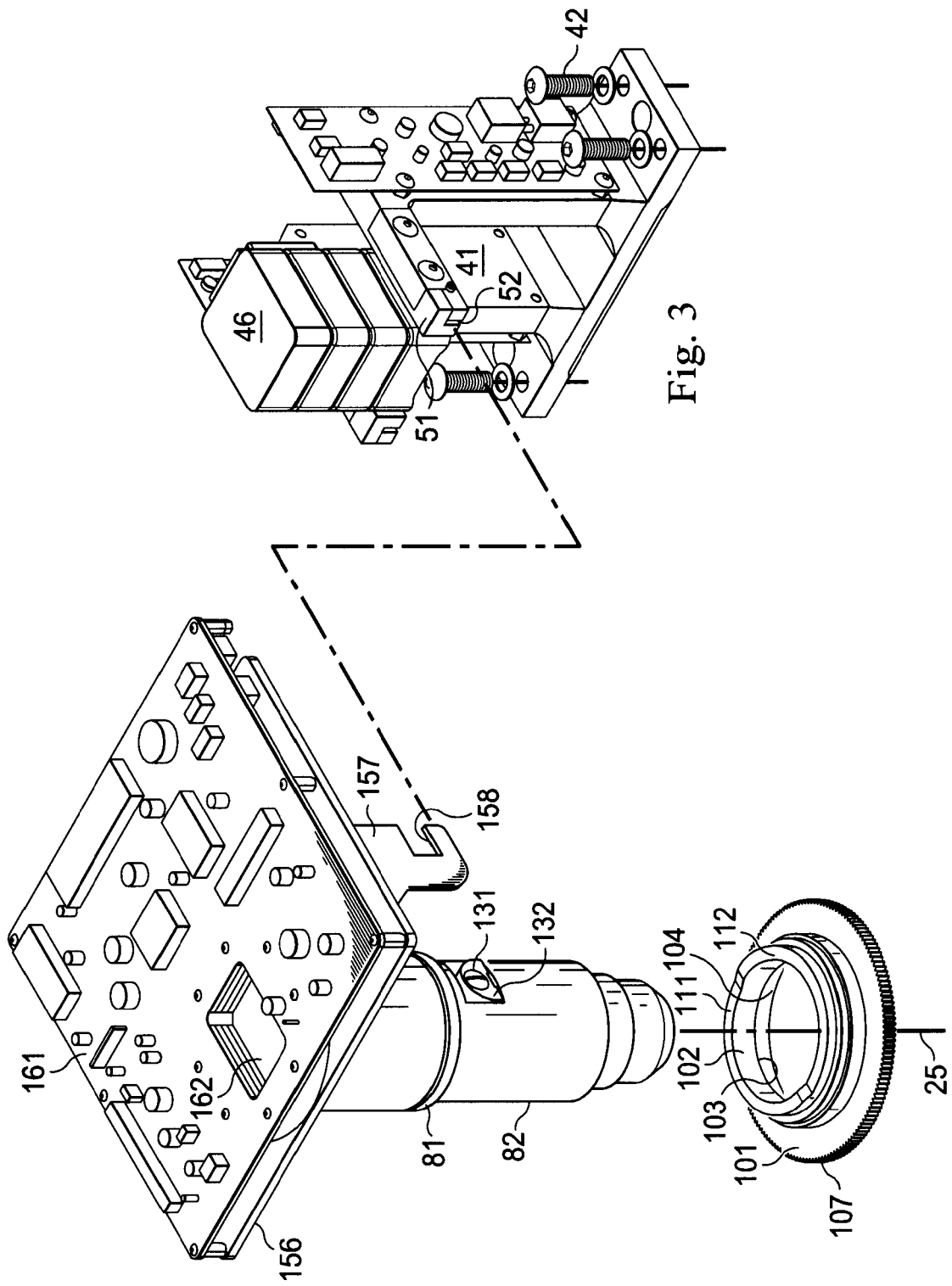
FIG. 3 is a diagrammatic perspective exploded view showing selected components from the microscope of FIGS. 1 and 2.

FIG. 3 is a diagrammatic perspective exploded view showing selected components from the microscope 10 of FIGS. 1 and 2. With reference to FIGS. 1 through 3, an aluminum support column 41 has its lower end fixedly secured to the base plate 16 by several screws 42, and extends vertically upwardly from the base plate. As shown in FIGS. 2 and 3, an electric motor 46 is fixedly secured to an upper portion of the support column 41, with an orientation so that a rotatable shaft 47 of the motor protects vertically downwardly from the motor. In the disclosed embodiment, the motor 46 is a stepper motor, but it could alternatively be any other suitable type of motor. A pinion gear 48 is fixedly secured to the lower end of the shaft 47, for a purpose discussed later. An anti-rotation section 51 is also fixedly secured to the upper portion of the support column 41, and has a vertically extending slot 52 therein for a purpose discussed later.

With reference to FIGS. 1 and 2, the microscope 10 has eight illumination modules, three of which are designated by respective reference numerals 61, 62 and 63. AS discussed above, the shell has eight circumferentially-spaced openings therethrough, two of which are identified by reference numerals 31 and 32. Each of these eight openings has fixedly but removably installed therein a respective one of the eight illumination modules, including the three illumination modules identified by reference numerals 61, 62 and 63. The eight illumination modules are each held in place by a single removable screw, for example as shown in 67 and 68 in FIG. 2 for the illumination modules 61 and 62. Each of the eight illumination modules can emit radiation that illuminates a not-illustrated specimen disposed at the location 37. In the microscope 10, the eight illumination modules are all different from each other. For example, the illumination modules each emit radiation having respective distinct characteristics, and typically no more than one of the eight illumination modules is energized at any given point in time. The structure and operation of the illumination modules is discussed in more detail later.

As shown in FIGS. 2 and 3, the microscope 10 includes a tubular barrel member 81 that is made of aluminum and that extends vertically through the cylindrical opening 24 in the projection 23 of the shell 17. The barrel member 81 has a cylindrical outer surface 82 that is concentric to the vertical axis 25, and that has a diameter slightly less than the inside diameter of the cylindrical opening 24. The cylindrical surface 82 slidably engages the cylindrical inner surface of the opening 24, so that the barrel member 81 is capable of reciprocal vertical sliding movement relative to the shell 17.

Figure 4:
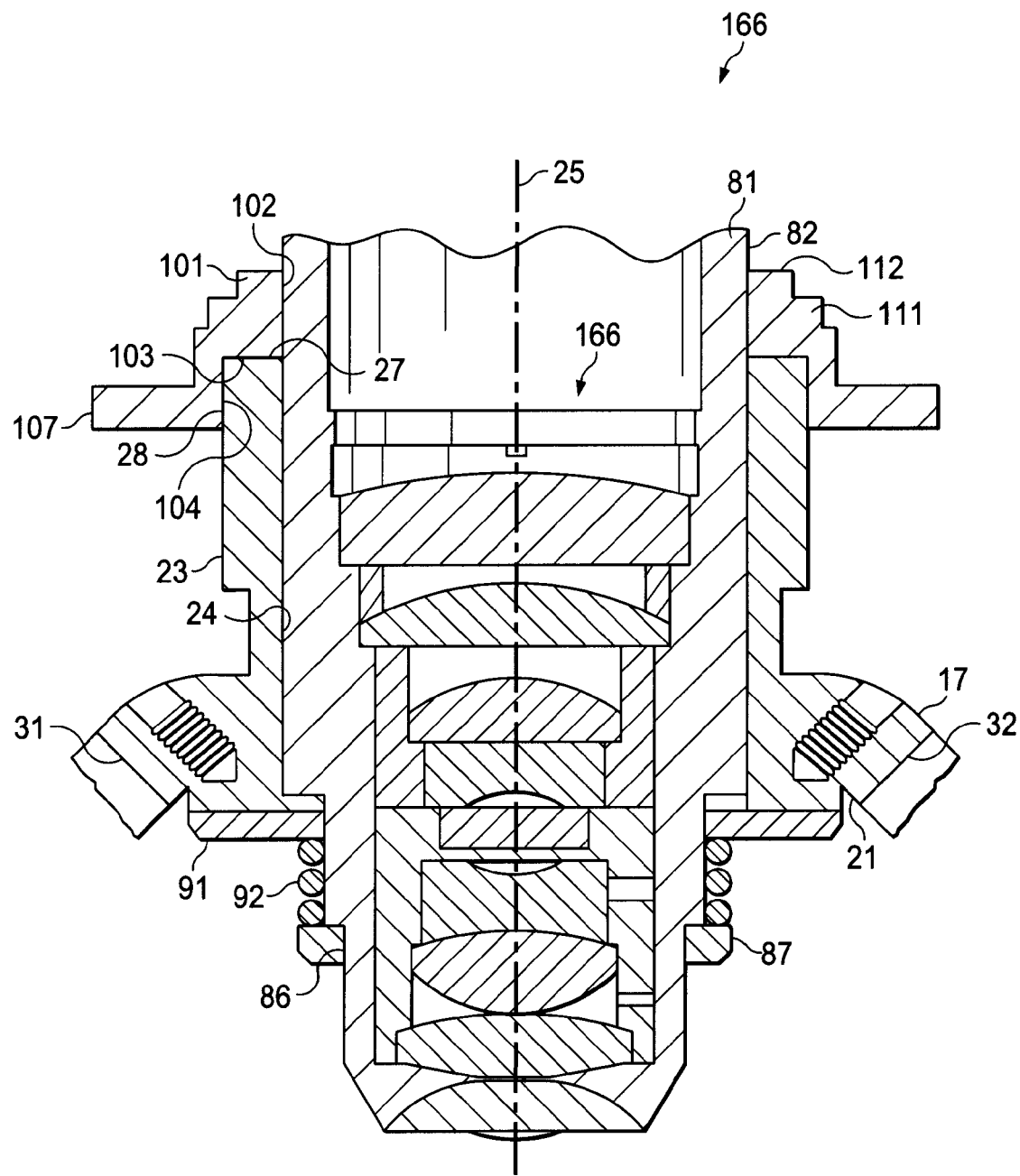
FIG. 4 is a diagrammatic fragmentary sectional side view that shows, in an enlarged scale, a portion of the structure of FIG. 2.

FIG. 4 is a diagrammatic fragmentary sectional side view that shows, in an enlarged scale, a portion of the structure of FIG. 2, including a lower portion of the barrel member 81, and some surrounding structure. As shown in FIG. 4, the barrel member 81 has an annular recess 86 near a lower end thereof. A retaining ring 87 is fixedly engaged in the annular recess 86 with a snap fit. A flat washer 91 encircles the barrel member 81 above the retaining ring 87, and has an upper surface that is disposed against a top surface of the chamber 21 in the shell 17. A resilient helical compression spring 92 encircles the barrel member 81 between the retaining ring 87 and the washer 91, and yieldably urges the retaining ring 87 away from the washer 91. This in turn causes the barrel member 81 to be urged downwardly in relation to the shell 17.

As best seen in FIGS. 2, 3 and 4, an annular gear 101 encircles the barrel member 81. In the disclosed embodiment, the gear 101 is made of aluminum, but it could alternatively be made of any other suitable material. The gear 101 has a radially inwardly facing cylindrical bearing surface 102 that slidably engages the cylindrical surface 82 on the barrel member 81, an annular axially-facing bearing surface 103 that slidably engages the bearing surface 27 on the shell 17, and a radially-inwardly facing annular bearing surface 104 that slidably engages the bearing surface 28 on the shell. As a result of the sliding engagement of these pairs of bearing surfaces, the annular gear 101 can rotate relative to the shell 17 and the barrel member 81. A lubricant is provided between these pairs of bearing surfaces. The lubricant used in the disclosed embodiment is available commercially as BRAYCOTE® 601 EF from Castrol Industrial North America, Inc. of Naperville, Ill. Alternatively, however, any other suitable lubricant could be used, or for some applications the lubricant could be omitted.

The annular gear 101 has a plurality of gear teeth 107 extending around the periphery thereof. As shown in FIG. 2, the gear teeth 107 on the gear 101 engage the gear teeth on the pinion gear 48. Thus, when the motor 46 rotates the gear 48, the gear 48 in turn rotates the gear 101.

Figure 5:
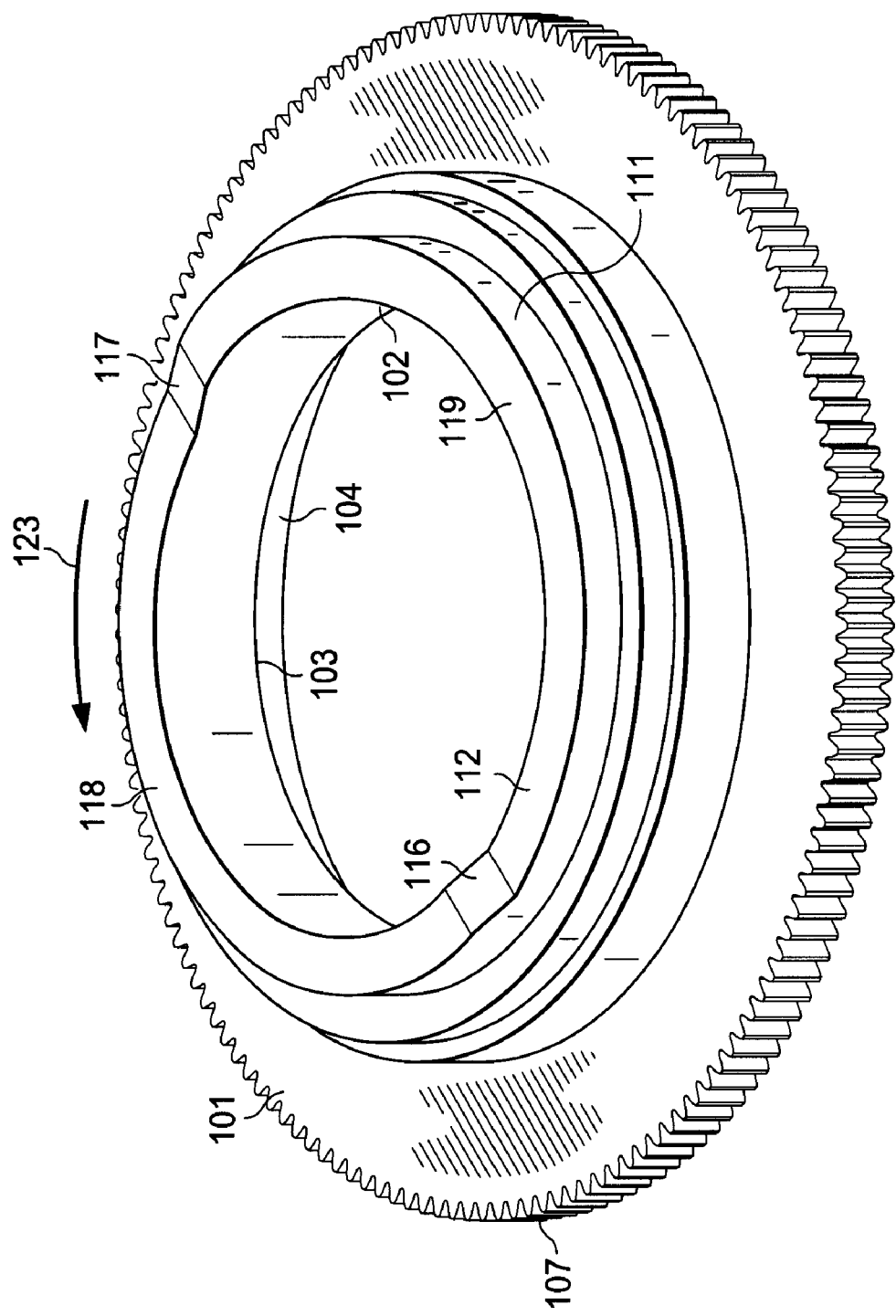
FIGS. 5 and 6 are respectively a diagrammatic perspective view and a diagrammatic top view that show, in an enlarged scale, a gear that is a component of the microscope of FIG. 1.
Figure 6:
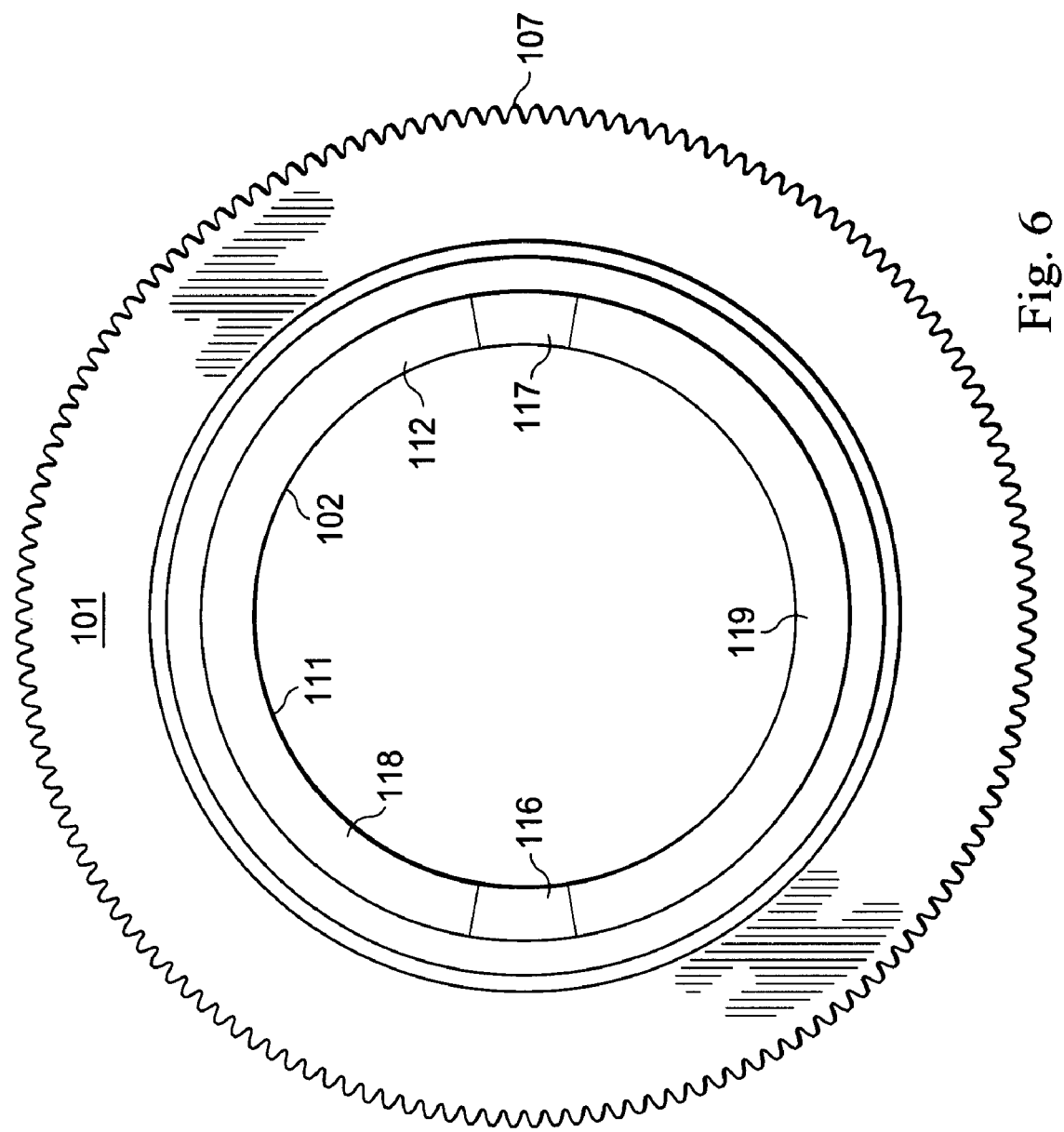

FIGS. 5 and 6 are respectively a diagrammatic perspective view and a diagrammatic top view of the gear 101, showing the gear in an enlarged scale. With reference to FIGS. 4, 5, and 6, the upper portion of the gear 101 serves as an annular cam 111 that extends completely around the barrel member 81. The cam 111 has thereon an upwardly-facing annular cam surface 112 that extends completely around the barrel member 81. As best seen in FIGS. 5 and 6, the cam surface 112 has two short transition surface portions 116 and 117 at diametrically opposed locations, and has longer cam surface portions 118 and 119 disposed between the transition surface portions 116 and 117. In a counterclockwise direction 123, as viewed in FIG. 5, the cam surface portion 118 progressively rises with a gradual slope from the transition surface portion 117 to the transition surface portion 116, the transition surface portion 116 then progressively drops with a significantly greater slope, the cam surface portion 119 then progressively rises with a gradual slope from the transition surface portion 116 to the transition surface portion 117, and then the transition surface portion 117 progressively drops with a significantly greater slope.

Figure 7:
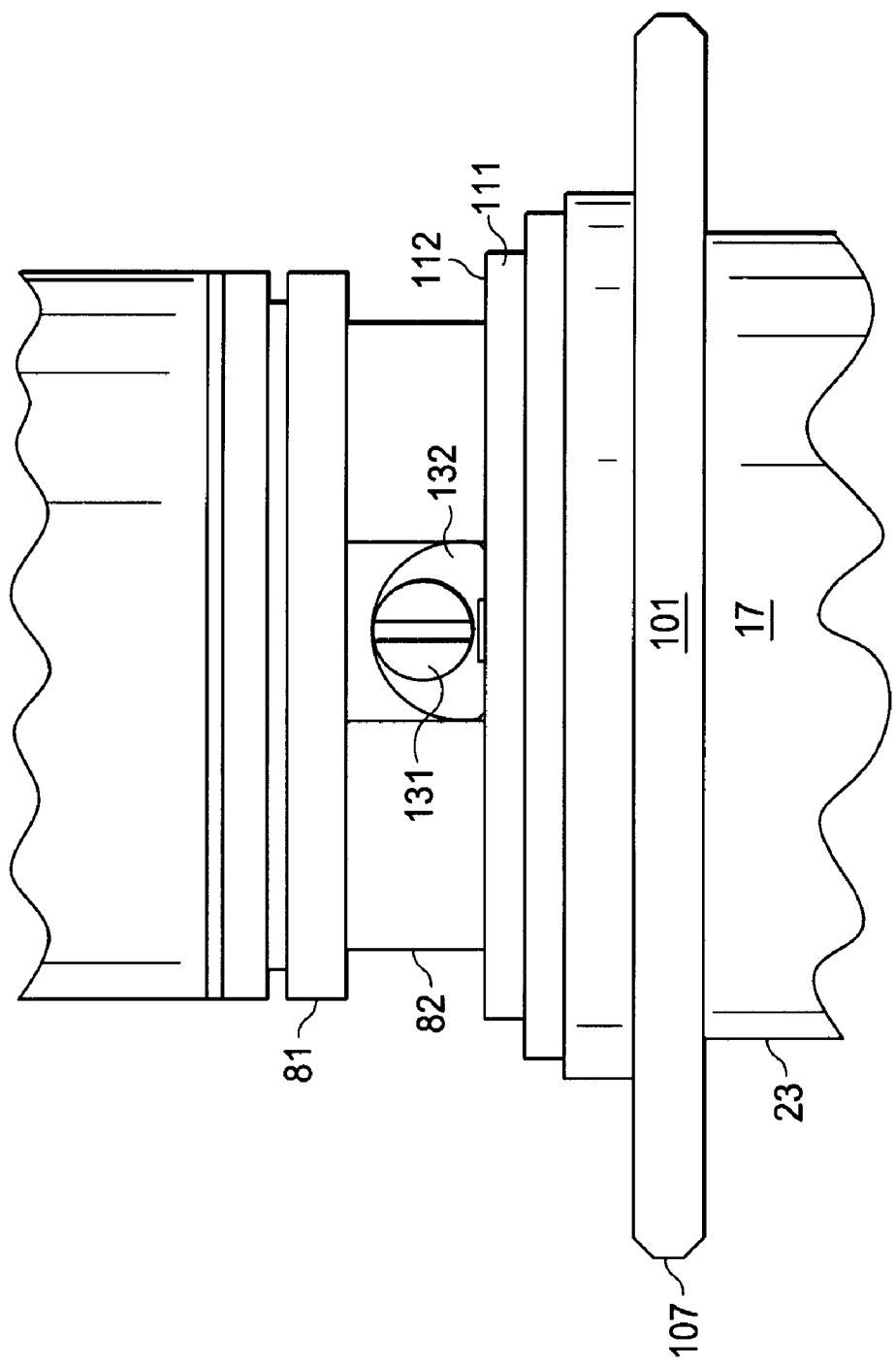
FIG. 7 is a diagrammatic fragmentary side view of the gear of FIGS. 5 and 6, and adjacent portions of other components of the microscope of FIG. 1.

FIG. 7 is a diagrammatic fragmentary side view of the gear 101, and adjacent portions of the barrel member 81 and shell 17. With reference to FIGS. 3 and 7, two screws 131 are disposed on diametrically opposite sides of the barrel member 81. The screws 131 each extend radially with respect to the vertical axis 25, and each engage a respect threaded radial opening provided in the barrel member 81. Two identical cam follower parts 132 are provided, and each is pivotally supported on a respective one of the two screws 131. The cam follower parts 132 each slidably engage the cam surface 112 on the gear 101. In the disclosed embodiment, the cam follower parts 132 are each made of nylon. However, they could alternatively be made of any other suitable material.

Figure 8:
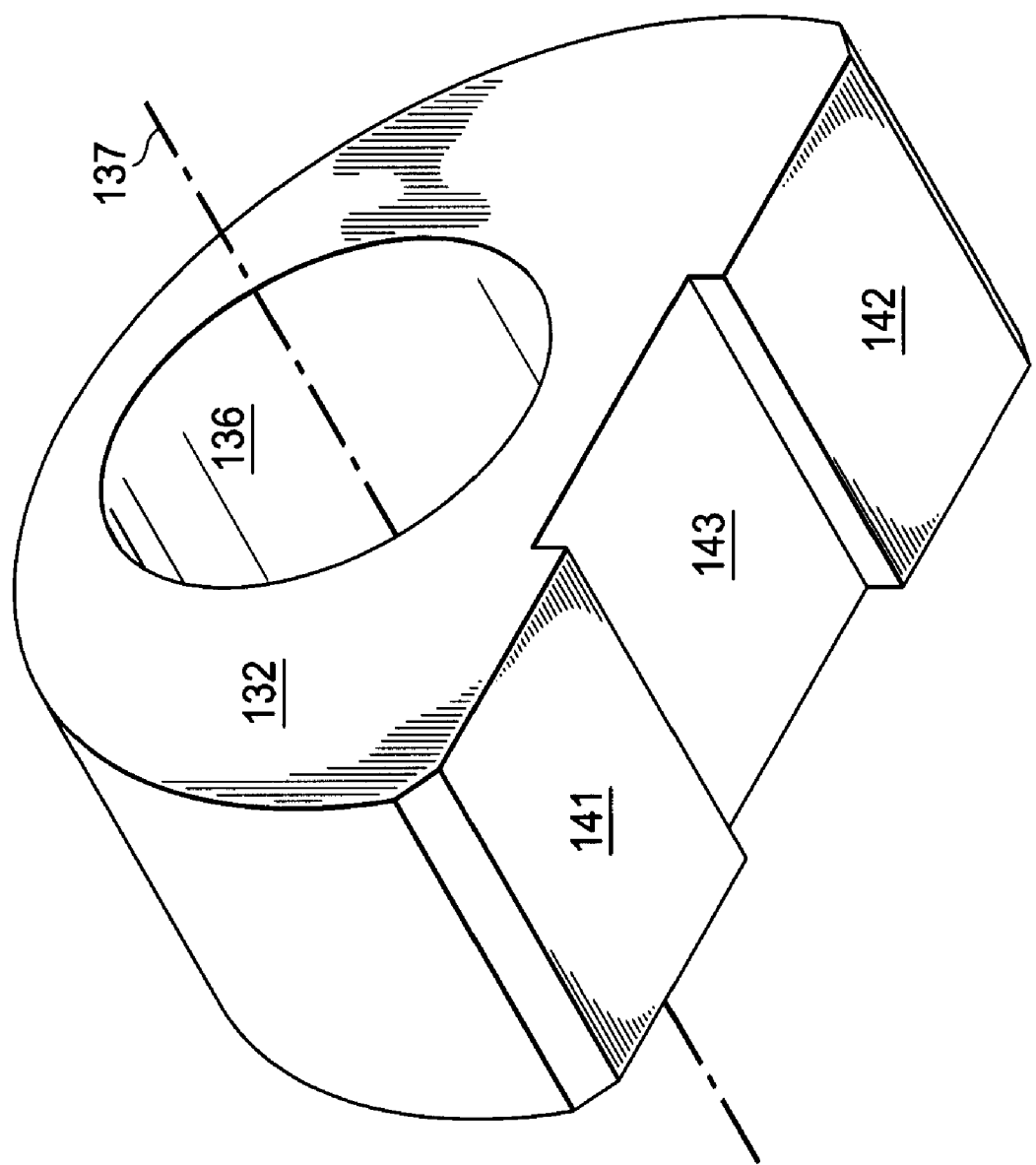
FIG. 8 is a diagrammatic perspective view of one of two identical cam follower parts that are components of the microscope of FIG. 1.

FIG. 8 is a diagrammatic perspective view of one of the cam follower parts 132. As shown in FIG. 8, the cam follower part 132 has a cylindrical opening 136 which extends therethrough, and which rotatably receives a shank of the associated screw 131. The cylindrical opening 136 is concentric to a pivot axis 137 of the cam follower part 132. The cam follower part has, on one side thereof, two spaced planar surfaces 141 and 142 that are substantially co-planar, and are separated by a shallow recess 143. The surfaces 141 and 142 are slider surfaces that each slidably engage the cam 112 on the gear 101.

As discussed above in association with FIG. 4, the compression spring 92 urges the barrel member 81 downwardly in relation to the shell 17 and the gear 101. As a result, the cam follower parts 132 on the barrel member 81 are urged downwardly against the upwardly-facing cam surface 112 on the gear 101, and this in turn urges the bearing surface 103 on the gear against the bearing surface 27 on the shell 17.

FIG. 1 shows an annular protective cover 146 that is provided around the barrel member 81 just above the gear 101, in order to cover and protect the cam surface 112 and the cam follower parts 132. The lower end of the cover 146 rests on top of the gear 101, at a location just radially outwardly of the cam 111 with the cam surface 112. Although the protective cover 146 is shown in FIG. 1, for clarity it is omitted from the other drawing figures.

With reference to FIGS. 1, 2 and 3, a horizontal plate is fixedly mounted to an upper end of the barrel member 81. An anti-rotation flange 157 is fixedly secured to and extends vertically downwardly from the underside of the plate 156, at a location spaced radially outwardly from the barrel member 81. The anti-rotation flange 157 has at its lower end a horizontally outwardly projecting tab 158 that is vertically slidably received within the vertical slot 52 of the anti-rotation section 51. The cooperation of the tab 158 and slot 52 prevents rotation of the barrel member 81 relative to the shell 17.

A circuit board 161 is disposed above and supported by the plate 156. An image sensor 162 of a known type is mounted on the circuit board 161, at a location so that the vertical axis 25 extends through a central portion of the image sensor. The plate 156 has an opening 164 (FIG. 2) that is disposed just below the image sensor 162.

With reference to FIGS. 2 and 4, an optics assembly 166 is installed within the barrel member 81, near the lower end of the barrel member. The optics assembly 166 includes several optical components, such as lenses. A detailed understanding of the optics 166 is not necessary to an understanding of the present invention, and the optics 166 are therefore not described here in detail. With reference to FIG. 2, the optics 166 form on the image sensor 162 an image of a region that is disposed at the lower end of the frustoconical opening 36, and that includes the location 37 at which a specimen can be supported.

As discussed above, the microscope 10 includes eight illumination modules, three of which are identified by reference numerals 61, 62, and 63. As also discussed above, these eight illumination modules are not all identical. For example, each emits radiation with a respective different color (wavelength).

Figure 9:
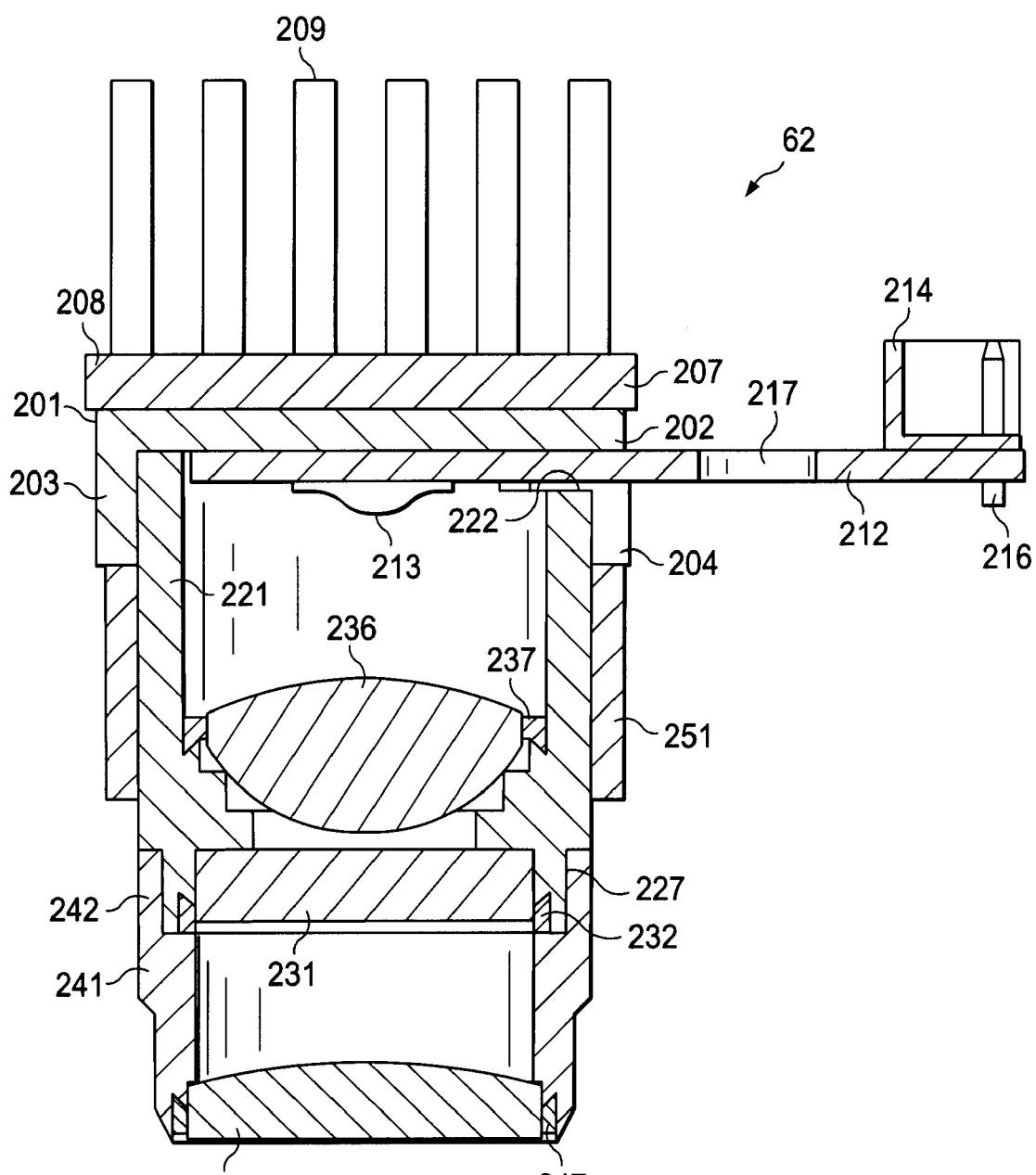
FIG. 9 is a diagrammatic central sectional side view of an illumination module that is a component of the microscope of FIG. 1.
Figure 10:
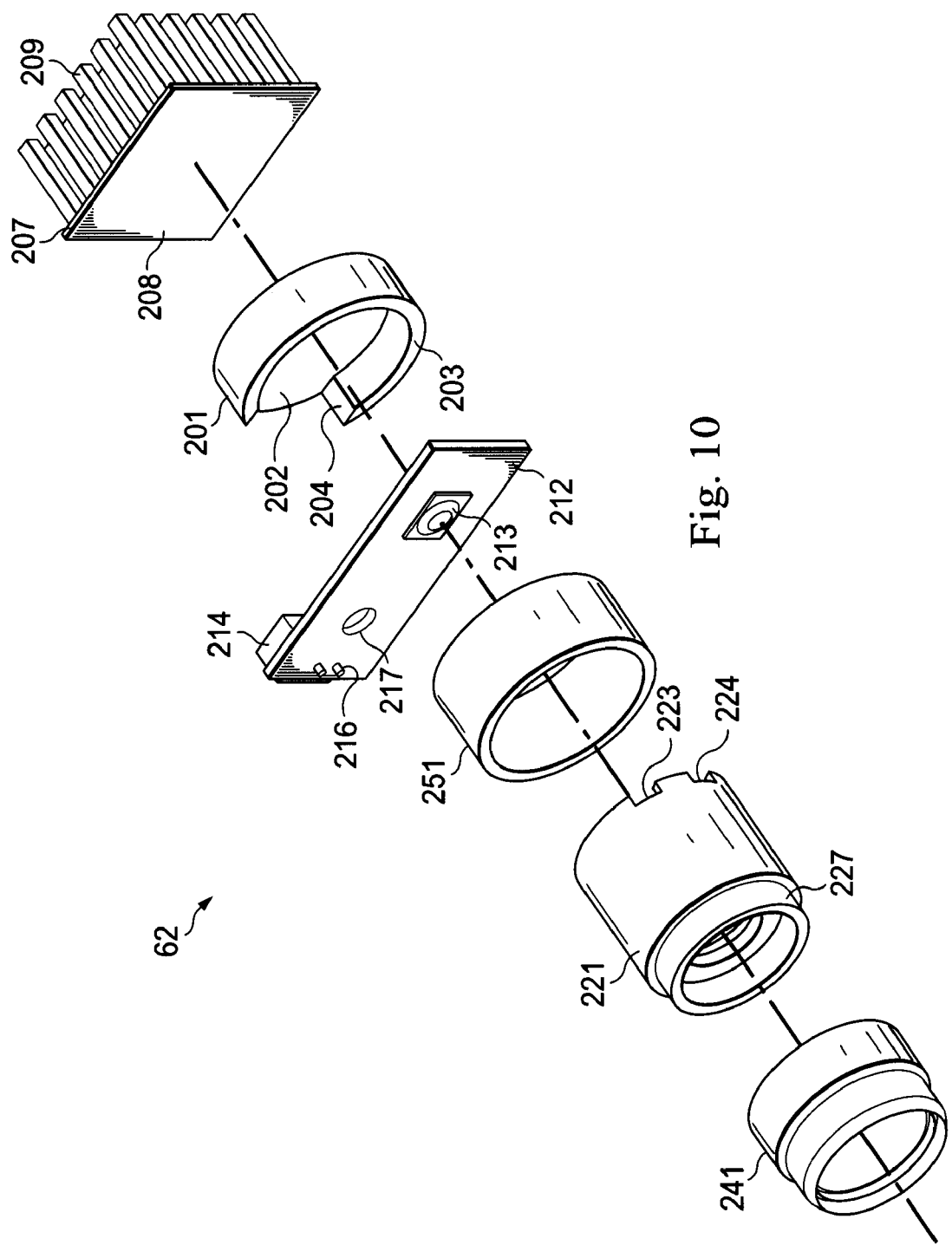
FIG. 10 is a diagrammatic perspective exploded view of the illumination module of FIG. 9.

FIG. 9 is a diagrammatic central sectional side view of the illumination module 62. FIG. 10 is a diagrammatic perspective exploded view of the illumination module 62. With reference to FIGS. 9 and 10, the illumination module 62 includes a member or cap 201 having a circular planar wall 202, and having a flange 203 that projects axially from a peripheral edge of the wall 201. A recess or gap 204 is provided through the flange 203. The member 201 is thermally conductive. In the disclosed embodiment, the member 201 is made from aluminum, but it could alternatively be made from any other suitable material.

A heat sink 207 has a base plate 208, and a plurality of spaced parallel projections 209 that extend outwardly from the base plate 208 on one side thereof. The heat sink 207 is thermally conductive. In the disclosed embodiment, the heat sink 207 is made from aluminum, but it could alternatively be made of any other suitable material. The base plate 208 of the heat sink 207 is fixedly secured to the circular wall 202 of the member 201 by a thermally-conductive adhesive that is not separately shown in the drawings. In the disclosed embodiment, the thermally-conductive adhesive is obtained commercially under the tradename TRA-BOND 2151 from TRA-CON, Inc. of Bedford, Mass. However, the heat sink 207 and member 201 could alternatively be physically and thermally coupled in any other suitable manner.

The illumination module 62 includes a small and elongate circuit board 212 with a radiation source 213 mounted on one end portion thereof, and an electrical connector 214 mounted on an opposite end portion thereof. The connector 214 and radiation source 213 are on opposite sides of the circuit board. The electrical connector 214 has two electrically conductive pins 216, and one end of each pin is soldered to a respective electrically-conductive run on the circuit board. The circuit board electrically couples the pins 216 of the connector 214 to respective terminals of the radiation source 213. In the disclosed embodiment, the radiation source 213 is a commercially-available light emitting diode (LED), and is therefore not described here in detail. The radiation source 213 in the illumination module 62 emits radiation having a center wavelength corresponding to a color commonly known as cyan. A not-illustrated cable has one end detachably coupled to the connector 214, and another end detachably coupled to a connector on another circuit board, in order to supply electrical power through the connector 214 and the circuit board 212 to the radiation source 213.

The end portion of the circuit board 212 having the radiation source 213 thereon is disposed against and fixedly secured to the circular wall 202 of the member 201. In the disclosed embodiment, this portion of the circuit board is adhesively secured to the wall 202 with the same thermally-conductive epoxy used to secure the heat sink 207 to the member 201. However, the heat sink 207, circuit board 212 and member 201 could alternatively be physically and thermally coupled in any other suitable manner. The opposite end portion of the circuit board 212 projects outwardly beyond the member 201, through the gap 204 in the flange 203. This end portion of the circuit board has a circular opening 217 therethrough adjacent the electrical connector 214. The screw 68 (FIG. 1) extends through the opening 217, in order to releasably secure the illumination module 62 to the shell 17 of the microscope 10.

With reference to FIGS. 9 and 10, the illumination module 62 includes a cylindrical tubular support 221 that has three notches 222 (FIG. 9) and 223-224 (FIG. 10) in one end thereof. In the disclosed embodiment, the support 221 is made from aluminum, but it could alternatively be made from any other suitable material. The notched end of the tubular support 221 is received within the flange 203 on the member 201, with the notch 222 aligned with the gap 204 in the flange 203. The notched end of the tubular support 221 has an outside diameter that is only slightly less than the inside diameter of the flange 203. An adhesive is provided between these two surfaces in order to fixedly secure the tubular support 221 to the member 201. In the disclosed embodiment, this adhesive is obtained commercially as LOCTITE® 380 from Henkel Corporation of Rocky Hill, Conn. However, it would alternatively be possible to couple the tubular support 221 to the member 201 in any other suitable manner.

The circuit board 212 extends outwardly through the notch 222 in the support 221. The notches 223 and 224 in the support 221 receive respective corners of the rectangular circuit board. At its outer end, the tubular support 221 has in its outer surface a circumferentially-extending annular groove 227.

An optical filter 231 of a known type is supported within the tubular support 221, near the outer end thereof. The filter 231 is held in place by a ring 232 of adhesive. In the disclosed embodiment, the adhesive includes a bond material obtained commercially under the trademark URALANE® 5753 from Huntsman Corporation of The Woodlands, Tex., with the addition of 0.4% by weight carbon lampblack to blacken and avoid fluorescence of the URALANE® bond material. Alternatively, however, the filter 231 could be held in place in any other suitable manner. The filter 231 is a bandpass filter having a center wavelength that is substantially the same as the center wavelength of the radiation emitted by the radiation source 213 (cyan).

A collimating lens 236 of a known type is provided within the tubular support 221, at a location between the filter 231 and the radiation source 213. The lens 236 is fixedly held in place by a ring 237 of the URALANE® adhesive mentioned above. However, the lens 236 could alternatively be held in place in any other suitable manner.

The illumination module 62 includes a cylindrical tubular extension 241 that is made of aluminum, but that could alternatively be made of any other suitable material. The tubular extension 241 has at one end an annular axial projection 242. The annular projection 242 is received within the annular recess 227 in the tubular support 221. The diameter of the radially-outwardly facing cylindrical surface in the recess 227 is slightly less than the diameter of the radially inwardly facing cylindrical surface on the annular projection 242. A quantity of the above-mentioned LOCTITE® 380 adhesive is provided between these two cylindrical surfaces, in order to fixedly secure the tubular extension 241 to the tubular support 221.

A focusing or condenser lens 246 of a known type is provided within the tubular extension 241, near the outer end thereof. The lens 246 is fixedly held in place by a ring 247 of the above-mentioned URALANE® 5753 adhesive. Alternatively, however, the lens 246 could be secured in place in any other suitable manner.

A cylindrical thermal barrier sleeve 251 encircles the tubular support 221, and has an inside diameter that is only slightly larger than the outside diameter of the tubular support 221. The thermal barrier sleeve 251 is fixedly secured to the tubular support 221 by a quantity of the above-mentioned LOCTITE® 380 adhesive. Alternatively, however, the sleeve 251 could be secured to the tubular support 221 in any other suitable manner. In the disclosed embodiment, the thermal barrier sleeve 251 is made of nylon. However, it could alternatively be made of any other suitable material that is thermally non-conductive, including but not limited to a plastic material.

Radiation emitted by the radiation source 213 travels downwardly in FIG. 9, and passes successively through the lens 236, the bandpass filter 231, and the lens 246. The lens 236 collimates the radiation from the source 213, the bandpass filter 231 removes wavelengths above and below the center wavelength of interest (which for the illumination module 62 is cyan), and the lens 246 takes the collimated and filtered radiation and focuses it to the specimen location 37 (FIG. 2). The filter 231 is positioned so that it is disposed in collimated radiation, with a reduced aperture. The filter 231 and the lenses 236 and 246 constitute all of the optics needed to deliver radiation from the radiation source 213 to the specimen location 37, and are all present within the removable illumination module 62. When the illumination module 62 is installed in the microscope 10, the thermal barrier sleeve 251 is disposed between the tubular support 221 and the shell 17, and resists heat flow from the illumination module to the shell. The majority of the heat emitted by the radiation source 213 flows through the member 202 to the heat sink 207, and is discharged to the ambient air disposed externally of the base 12 of the microscope.

The illumination module 62 is intentionally configured to be a very low-cost component. In this regard, the illumination module 62 uses a minimal number of optical components. Further, the filter 231 and the lenses 236 and 246 are each an inexpensive, mass-produced component that can be readily commercially obtained. For example, the lenses 236 and 246 can each be a molded plastic part. The heat sink 207 is also an inexpensive, mass-produced component that is readily commercially available. The illumination module 62 does not contain any threaded parts that screw together, and that would be relatively expensive to fabricate. Instead, the radiation source 213 and the connector 214 are each soldered to the circuit board 212, and the circuit board 212 and other components are coupled to each other through the use of appropriate low-cost adhesives, including a thermally-conductive adhesive where appropriate.

Figure 11:
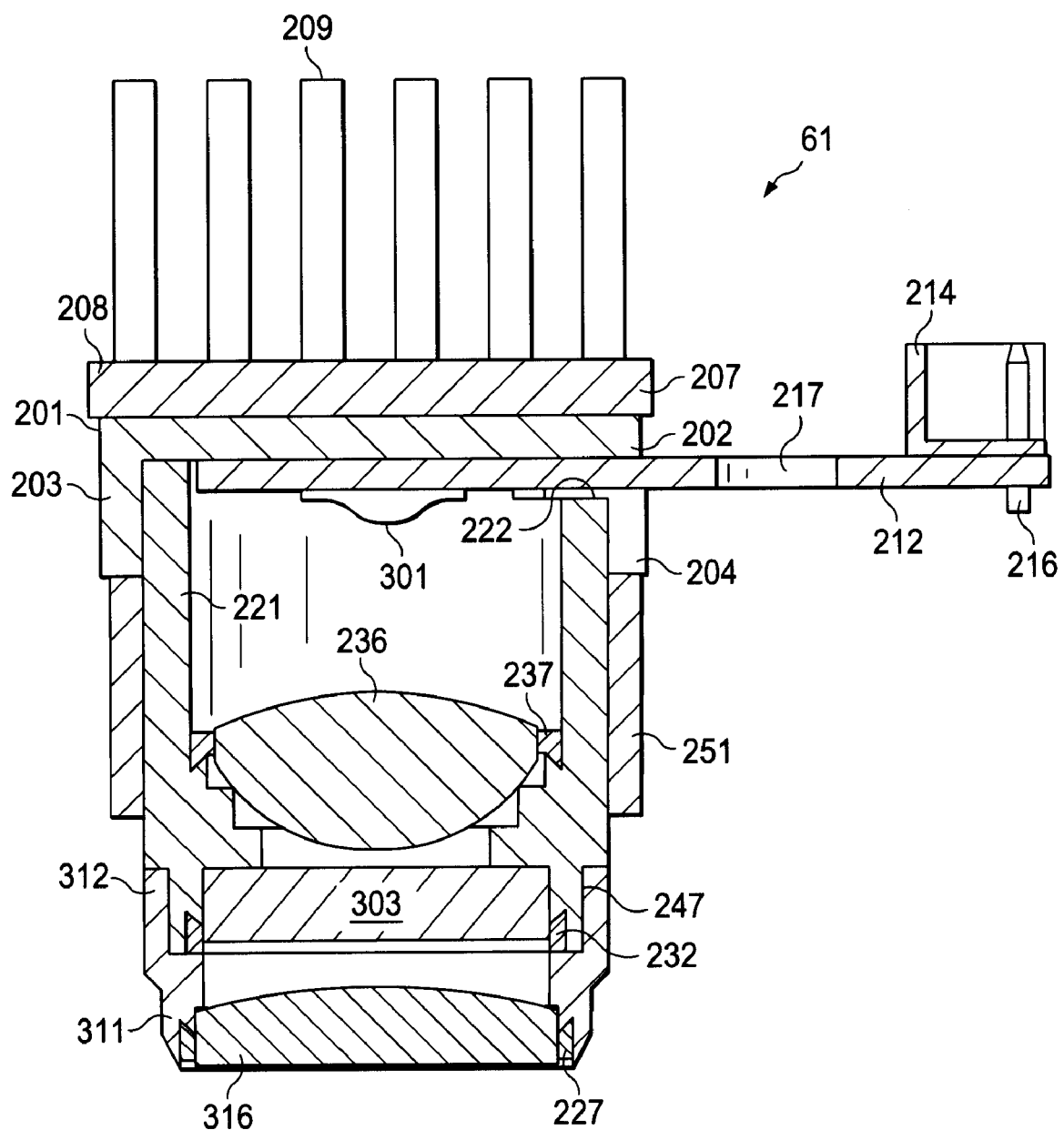
FIG. 11 is a diagrammatic central sectional side view similar to FIG. 9, but showing a different illumination module that is a component of the microscope of FIG. 1.

FIG. 11 is a diagrammatic central sectional side view similar to FIG. 9, but showing the illumination module 61 rather than the illumination module 62. The illumination module 61 is identical to the illumination module 62, except for certain differences that are discussed below. Parts in FIG. 11 that are similar or identical to parts in FIG. 9 are identified in FIG. 11 with the same reference numerals used for those parts in FIG. 9.

The illumination module 61 has on the circuit board 212 a radiation source 301. The radiation source 301 is an LED that produces radiation at a center wavelength different from the center wavelength of radiation emitted by the radiation source 213 of FIG. 9. In particular, the radiation source 301 emits radiation with a wavelength corresponding to the color red. The illumination module 61 has a bandpass filter 303 that is different from the bandpass filter 231 of FIG. 9, in that the bandpass filter 303 has a center wavelength that is the same as the center wavelength of the radiation emitted by the radiation source 301. In particular, the filter 303 has a passband with a center wavelength corresponding to the color red.

The illumination module 61 has a cylindrical tubular extension 311 that is similar to the tubular extension 241 in the embodiment of FIG. 9, except that the tubular extension 311 is axially shorter than the tubular extension 241. The tubular extension 311 has an annular axial projection 312 that engages and is adhesively secured in the annular recess 227 of the tubular support 221. The illumination module 61 has a focusing lens 316 that is fixedly mounted in the lower end of the tubular extension 311, in place of the focusing lens 246 in the embodiment of FIG. 9. The focusing lens 316 is selected to properly focus the radiation with a red wavelength that is emitted by the radiation source 301. The shorter axial length of the tubular extension 311, in comparison to the axial length of the tubular extension 241 in FIG. 9, reflects the fact that the focal length of the lens 316 is different from the focal length of the lens 246.

Figure 12:
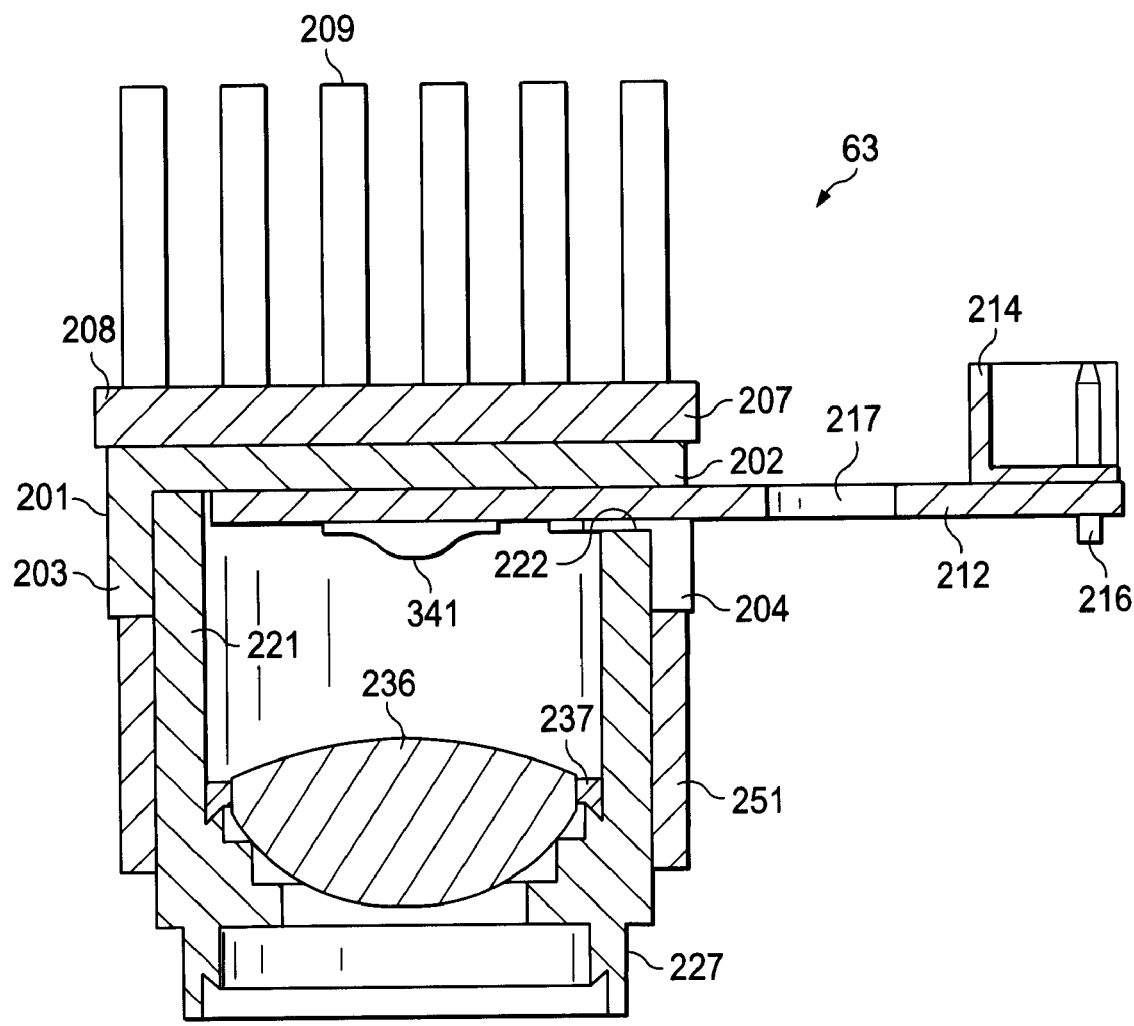
FIG. 12 is a diagrammatic central sectional side view similar to FIGS. 9 and 11, but showing yet another illumination module that is a component of the microscope of FIG. 1.

FIG. 12 is a diagrammatic central sectional side view similar to FIGS. 9 and 11, but showing the illumination module 63. The illumination module 63 is identical to the illumination 62 of FIG. 9, except for certain differences that are discussed below. The illumination module 63 does not include the filter 231, tubular extension 241, lens 246, or retaining rings 232 and 247 that are present in the illumination module 62 of FIG. 9. In addition, a radiation source 341 provided on the circuit board 212 is different from the radiation source 213 shown in FIG. 9. In particular, the radiation source 341 of FIG. 12 is an LED that emits radiation with a plurality of different wavelengths, or in other words radiation that is commonly referred to as "white light". The lens 236 collimates this white light. Since this radiation contains a variety of wavelengths, there is no need for a bandpass filter such as that shown at 231 in FIG. 9, or a focusing lens such as that shown at 246 in FIG. 9.

Although selected embodiments have been illustrated and described in detail, it should be understood that a variety of substitutions and alterations are possible without departing from the spirit and scope of the present invention, as defined by the claims that follow.

What is claimed is:

1. An apparatus comprising a microscope that includes:
   a base having a wall portion defining a chamber, said chamber located above and providing access to a location for a specimen, said wall portion having a plurality of openings therein that extend through said wall portion from said chamber to a region external to said base;
   imaging optics supported on said base and at least partially located within said chamber, and configured to image a region that includes said location;
   a first illumination module removably installed in a first opening of said plurality of openings and supported on said base, said first illumination module including a first source of first radiation, and including first illumination optics positioned between said first source and said location and configured to deliver said first radiation from said first source to said location, said first illumination optics including a first lens positioned between said first source and said location so that said first radiation travelling from said first source to said location passes through said first lens; and a second illumination module removable installed in a second opening of said plurality of openings and supported on said base, said second illumination module including a second source of second radiation and second illumination optics configured to deliver said second radiation to said location, said second illumination optics including a second lens positioned between said second source and said location so that said second radiation travelling from said second source to said location passes through said second lens, said second radiation being in a different wavelength range than said first radiation.

2. An apparatus according to claim 1, wherein said first illumination optics includes a filter positioned between said first lens and said location so that said first radiation travelling from said first source to said location passes through said filter.

3. An apparatus according to claim 2, wherein said first lens is a collimating lens and said first illumination optics includes a focusing lens, wherein said filter is positioned between said collimating lens and said focusing lens so that said radiation travelling from said first source to said location passes successively through said collimating lens, said filter and said focusing lens.

4. An apparatus according to claim 1, wherein said second lens is a collimating lens, said second optics includes a bandpass filter configured to pass said second radiation, and a focusing lens, and said bandpass filter is positioned between said collimating lens and said focusing lens so that said second radiation from said second source passes successively through said collimating lens, said bandpass filter and said focusing lens to said location.

5. An apparatus comprising a microscope that includes:
a base:
imaging optics supported on said base and configured to image a region that includes a location for a specimen; and
an illumination module removably supported on said base, said illumination module including:
a source of radiation;
a thermally conductive member;
a circuit board having first and second portions that are mutually exclusive, said first portion being adjacent said thermally conductive member and having said source mounted thereon, and said second portion extending away from said thermally conductive member and having an electrical connector thereon, said circuit board electrically coupling said source and said connector;
a first thermally conductive adhesive fixedly coupling said first portion of said circuit board to said thermally conductive member;
a tubular support having one end adjacent said thermally conductive member;
a second adhesive disposed between said thermally conductive member and said end of said tubular support and fixedly securing said end of said tubular support to said thermally conductive member;
illumination optics configured to deliver radiation from said radiation source to said location, said illumination optics including a lens fixedly supported within said tubular support and positioned between said source and said location such that said radiation travelling from said source to said location passes through said lens;
a tubular thermal barrier extending around said tubular support; and
a third adhesive fixedly securing said thermal barrier to said tubular support.

6. An apparatus according to claim 5,
wherein said base includes a threaded opening;
wherein said second portion of said circuit board has an opening extending therethrough; and
including a screw that extends through said opening in said circuit board and engages a said threaded opening in said base to fixedly releasably couple said illumination module to said base.

7. An apparatus according to claim 5, wherein said illumination module includes a heat sink disposed on an opposite side of said thermally conductive member from said circuit board, and a fourth thermally conductive adhesive fixedly coupling said heat sink to said thermally conductive member.

8. An apparatus according to claim 5, wherein said illumination optics includes a filter supported in said tubular support on a side of said lens remote from said source such that said lens is positioned between said filter and said source, said radiation traveling from said source to said location passing successively through said lens and said filter.

9. An apparatus according to claim 8,
wherein said lens in said tubular support is a collimating lens;
wherein said illumination module includes a tubular extension having an end adjacent a second end of said tubular support remote from said thermally conductive member, and includes a fourth adhesive fixedly securing said end of said tubular extension to said second end of said tubular support; and
wherein said illumination optics includes a focusing lens fixedly supported in said tubular extension and positioned between said filter and said location so that said radiation travelling from said source to said location passes through said focusing lens after passing through said filter.

10. An apparatus according to claim 1, wherein at least one of said first and second illumination modules includes heat dissipation structure that is disposed in a region external to said base and that dissipates heat from said corresponding first or second source.

11. An apparatus according to claim 1, wherein said first illumination module includes a circuit board having said first source and an electrical connector thereon, said circuit board electrically coupling said source and said connector, said circuit board extending outward from said first opening into said region external to said base, said connector being located on a portion of said circuit board that is in said region external to said base.

12. An apparatus according to claim 1, wherein said first illumination module has a thermal barrier extending around at least a portion of said first illumination optics and said first source and that resists heat transfer from said illumination module to said base.

13. An apparatus according to claim 1, wherein said microscope is a fluorescence analysis microscope.

14. A method of operating a microscope that includes a base having thereon imaging optics that image a region including a location for a specimen, said method comprising:

removably supporting on said base a first illumination module that includes a first source of radiation and first illumination optics;

delivering first radiation from said first source to said location utilizing first optical structure embodied entirely within said first illumination optics, said delivering first radiation including directing said first radiation from said first source through a first lens that is part of the first illumination optics to said location;

removably supporting on said base a second illumination module that includes a second source of radiation and second illumination optics; and delivering second radiation from said second source to said location utilizing second optical structure embodied entirely within said second illumination optics, said delivering second radiation including directing said second radiation from said second source through a second lens that is part of the second illumination optics to said location.

15. A method according to claim 14, wherein said delivering second radiation includes collimating said second radiation with said second lens, filtering said second radiation with a filter and focusing said second radiation with a focusing lens, said filter and said focusing lens being part of said second illumination optics, said second lens being a collimating lens.

16. A method according to claim 14, including configuring said first and second illumination optics so that said first radiation emitted by said first illumination module is different from said second radiation emitted by said second illumination module.

17. An apparatus according to claim 8, wherein said illumination module includes a ring of fourth adhesive positioned between said filter and said tubular support and fixedly securing said filter in said tubular support.

18. An apparatus according to claim 5, wherein said tubular support is made of aluminum.

19. An apparatus according to claim 5, wherein said base includes a wall portion defining a chamber, said chamber located above and providing access to said location, said wall portion having an opening therein that extends through said wall portion from said chamber to a region external to said base, and wherein said illumination module is removably installed in said opening.

20. An apparatus according to claim 19, wherein said imaging optics is located within said chamber.

* * * * *

UNITED STATES PATENT AND TRADEMARK OFFICE
CERTIFICATE OF CORRECTION

| | |
|---|---|
| PATENT NO. | : 8,254,021 B2 |
| APPLICATION NO. | : 12/490149 |
| DATED | : August 28, 2012 |
| INVENTOR(S) | : Peter A. Rozitis et al. |

It is certified that error appears in the above-identified patent and that said Letters Patent is hereby corrected as shown below:

In Claim 5, column 9, line 41, "a base:" should be replaced with --a base;--.

In Claim 6, column 10, line 16, "a said" should be replaced with --said--.

Signed and Sealed this
Sixth Day of November, 2012

David J. Kappos
*Director of the United States Patent and Trademark Office*